Figure 1:
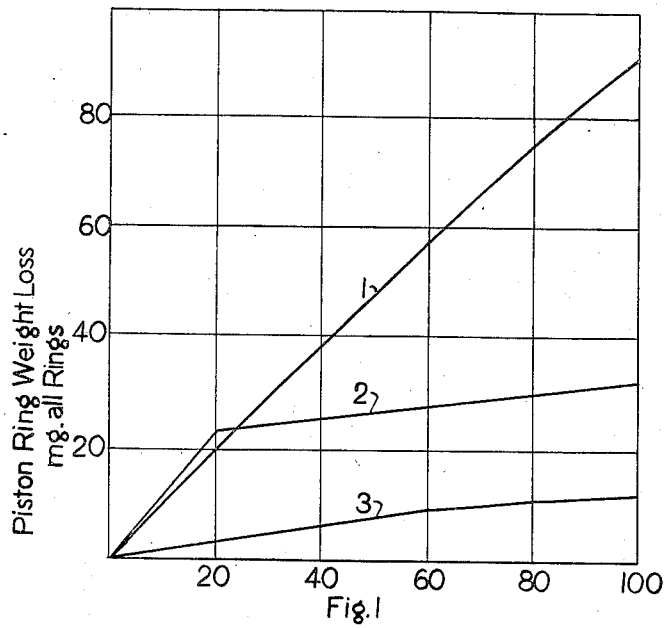
Figure 2:
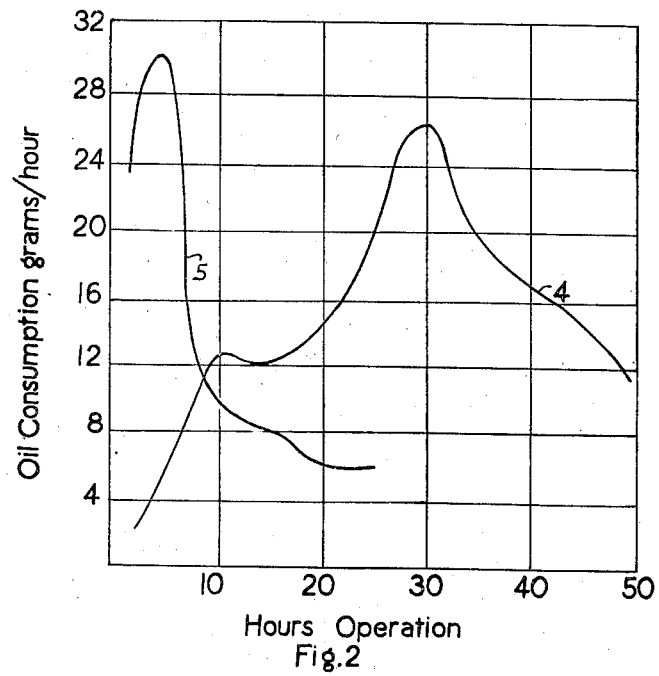

Dec. 12, 1944.  W. M. MALOTT  2,364,990
BREAK-IN FUEL AND METHOD FOR BREAKING IN
INTERNAL-COMBUSTION ENGINES
Original Filed Aug. 3, 1943

Inventor: William Morris Malott
By his Attorney:

Patented Dec. 12, 1944

2,364,990

UNITED STATES PATENT OFFICE 2,364,990

BREAK-IN FUEL AND METHOD FOR BREAK-ING IN INTERNAL-COMBUSTION ENGINES

William Morris Malott, Lafayette, Calif., assignor to Shell Development Company, San Francisco, Calif., a corporation of Delaware Original application August 3, 1943, Serial No. 497,250. Divided and this application February 2, 1944, Serial No. 521,001

6 Claims. (Cl. 123—1)

The present invention relates to spark-ignition engine fuels particularly suitable for breaking in engines and a procedure for applying such fuel to best advantage.

At the present time, in the manufacture of spark-ignition internal combustion engines, particularly aircraft engines, it is considered necessary procedure to run the newly assembled engine for a period of time on a test stand, or in the instance of automotive engines to run the automobile at a reduced speed for a given distance. In the case of aircraft engines, this break-in period, usually lasting from 3 to 10 hours or longer, is made necessary by the fact that the engine must be ready to produce full power at maximum load, if necessary, the first few minutes of operation after leaving the factory. Since it is impractical in production line manufacture to machine piston ring and cylinder surfaces to the point of perfect matching, the break-in period at relatively light loading and slow speed is necessary to wear the piston rings and cylinder surfaces to the required high polish and perfectly matched fit. This prolonged break-in period of each engine is a considerable burden to the engine manufacturer. For this reason, the development of a fuel and/or method permitting a more rapid break-in of internal combustion engines has long been considered highly desirable.

Several methods have been used in the past to accelerate wear-in. Cold operation of the engine to bring about corrosive wear in the cylinder by condensation of water of combustion produces practically all the wear at the top of the ring travel and hence introduces a tapered bore. Furthermore, cold corrosion is difficult to control because of its sensitivity to all operating factors affecting pressures and temperatures during the combustion stroke.

Hand lapping the rings in the cylinder using a grinding compound has been found satisfactory in some cases, but in most instances it has also been found that small quantities of lapping compound remain embedded in the cast iron and thus lead to increased wear at a later time. Because of the very few strokes required, control of the process is difficult and a stringent cleaning procedure is required to remove the lapping compound. For these reasons, hand lapping is considered unsatisfactory for general application.

Gasoline additives, the action of which is chemical in nature, have also been tried to reduce engine break-in time. However, due to the temperature gradient along the cylinder, the action of such additives is more effective and pronounced near the top of the cylinder barrel than the bottom, thus producing undesirable tapering of the barrel.

A fuel additive employed for the purpose of shortening the break-in period of internal combustion engines must have the following characteristics:

1. It must provide more rapid seating of rubbing surfaces.
2. It must leave the surfaces smooth and free of scratches, scuffs or scores.
3. The surfaces must be left in their natural state without a chemically bonded surface layer subject to removal during later operation.
4. The wear must be uniform throughout the ring travel so as not to introduce cylinder taper.
5. The wear-in process must be completely under the control of the operator so that it can be stopped after a prescribed interval.
6. The additive must not introduce materials or surface deposits that cannot be removed by flushing.

It is an object of the present invention to provide an internal combustion engine fuel, containing an additive, which is specifically designed for use over short periods of time to break in engines. A further object is to provide a fuel in this category which meets all of the basic requirements for such fuels set forth above. Another object is to provide a method for breaking in internal combustion engines whereby this fuel is employed to great advantage and whereby the known disadvantages of similar fuels are overcome. Other objects, together with some of the advantages to be derived from employing the fuels of the present invention, will become apparent from the following detailed description of the invention, together with the accompanying drawing wherein:

Figure I includes a series of curves in which are plotted piston ring wear against hours of engine operation for various fuels, and Figure II includes a pair of curves in which are plotted engine oil consumption against hours of engine operation for undoped fuel and a fuel of the present invention.

According to the instant invention the break-in period for spark-ignition internal combustion engines is materially shortened by use of a fuel containing iron carbonyl in amounts insufficient to materially raise the anti-detonating value of the fuel as determined by the 1C and 3C methods of the Cooperative Fuel Research—Aviation Fuel Division. These test methods are at the present time the officially accepted basis for evaluation of anti-detonating properties of aviation gasolines.

It has been known for some time that iron carbonyl is an anti-detonation agent for gasoline type fuels, having an anti-detonation efficiency believed to be about 1/5 that of tetraethyl lead. However, its use has never become widespread because of the relatively large quantities of iron oxide deposited in the engine as a result of the decomposition of the iron carbonyl. After prolonged use, the quantities of iron oxide build up to a point whereat difficulty in the operation of the engine due to fouling of the spark plugs, plugging of oil filters, and the like, occurs.

It has been found that these iron oxide decomposition products are in a form similar, if not identical, to jewelers' rouge, which is well known as a very fine polishing agent and generally employed for the finishing polish of optical and jewelry goods. Under proper and controlled conditions, as will be explained below, advantage may be taken of this fact to provide a rouge polishing of cylinder surfaces by incorporating amounts of iron carbonyl in a gasoline fuel. The rouge obtained as a decomposition product of iron carbonyl under engine operating conditions is in an extremely finely divided form and appears to be ideal for the mechanical polishing of cylinder walls and piston ring faces. It does not cause scratches, scuff marks or scores and its action is uniform over the entire length of piston ring travel since it is entirely a function of mild mechanical abrasion.

It has been discovered that a suitable break-in fuel can be produced by adding to a gasoline an amount of iron carbonyl—$Fe(CO)_5$—insufficient materially to raise the anti-detonation value thereof. This fuel may be used to operate a new engine for a period of at least 1 and not more than about 20 hours, preferably less than 10; and especially in the case of aircraft engines, preferably between 1 and 5 hours; and thereafter continuing operation of the engines on a standard or regular fuel free from iron carbonyl.

The fuel to which the iron carbonyl is added should have the detonating value generally used in breaking in the engine at hand; fuels having an anti-detonation value equivalent to at least an octane number of about 70 or more are generally preferred or required for aircraft engine break-ins. The gasoline may be straight run, cracked or synthesized (as by alkylation, polymerization, etc.) or may be a blend of one or several components. It may or may not contain tetraethyl lead in the customary amounts up to about 4 cc.; or aniline, toluidene, xylidenes or other aromatic amines of not more than about 9 carbon atoms in amounts of about ½% to 5%; as well as other additives to raise the antiknock value or to adjust volatility, or both.

The amounts of iron carbonyl which may be added to the fuel for the present purpose will ordinarily range from at least approximately .5 to 2 cc. per gallon. The addition of this amount of iron carbonyl to gasolines fails to materially raise the anti-knock value of the gasoline, and whatever rise in anti-knock rating is perceptible, as determined by the knock-rating test methods set forth in U. S. Army and Navy Specifications AN–VV–F–746 and AN–VV–F–748.

In developing the fuel of this invention and the method of application, the action of the iron carbonyl was studied in a Lauson engine fitted with an external sump suited to oil consumption measurements. This engine was further modified to take a Ford 60 cylinder sleeve and thus provide, together with new piston rings, a new rubbing surface for each test.

The Ford 60 sleeves are made of seamless steel tubing with the inner surface case hardened to about .003 inch depth. The sleeves were carefully weighed before and after complete tests to determine the amount of metal lost by wear.

Piston ring weights were taken each time the engine was dismantled for inspection. The sleeve surface was measured after each test by a profilometer to determine the magnitude of the surface roughness in R. M. S. microinches. Measurements of the oil consumption were also made.

In these tests the procedure employed included a 5-hour graduated break-in starting with a 4% load which was gradually increased to 100% load over this 5-hour period. When the test was continued for more than 5 hours, operation was at full load and full speed of 2100 R. P. M. at an air-fuel ratio of 13.5:1. The oil temperature was maintained at 270° F. and jacket temperature at 212° F.

In the accompanying drawing are shown the results of two typical tests.

Figure I shows the rate of piston ring wear of a fuel containing 1 cc. per gallon iron carbonyl as against an identical fuel free from iron carbonyl. Three curves are shown, curve 1 depicting the rate of wear upon continued operation for 100 hours with the fuel containing the iron carbonyl; curve 2 depicting the rate of wear when operating on the iron carbonyl fuel for 20 hours and then continuing with the clear fuel; and curve 3 showing the rate of wear when operating with a clear fuel for 100 hours. As will be noted, when switching from the iron carbonyl fuel to the clear fuel, the rate of wear is identical with that found when continuously operating on the clear fuel. In other words, iron oxide deposited from the iron carbonyl fuel is not carried over in sufficient quantities to continue causing high wear, when switching to a fuel free from iron carbonyl.

In Figure II, oil consumption is shown when operating with fuels with or without iron carbonyl. Curve 4 of Figure II shows oil consumption when employing a clear fuel not containing iron carbonyl, while curve 5 shows the oil consumption when operating with iron carbonyl. As will be noted, the peak of oil consumption is reduced from about 30 hours to about 5 hours.

The fuel employed in these tests was a typical 91 octane number aircraft fuel containing tetraethyl lead. The addition of the iron carbonyl did not change its anti-knock rating as measured by the two testing methods previously noted.

As is known, iron carbonyl decomposes readily, liberating CO, thereby forming a precipitate. The addition of certain oxidation inhibitors is capable of sufficiently stabilizing gasoline containing iron carbonyl in the small quantities required for the instant purpose to produce a fuel which can be stored in the dark at least for reasonable periods of time so as to make the use of iron carbonyl fuels practical for various break-in purposes.

With the aid of the break-in fuel of this invention, engines can be broken in both on the test stand and in actual use. Aircraft engines will normally be broken in on the ground in a stand; while automotive engines may be broken in, as has been customary, by driving the car slowly on the road for a given distance. However, the time or distance is shortened considerably when using the break-in fuel as against a standard fuel. Thus an automobile engine may be broken in thoroughly by driving it less than 200 miles as against the 1000 miles or more as has been required before. Thus, if the manufacturer of the automobile furnishes with the car, say, 5 to 10 gallons of the break-in fuel of this invention, the break-in period for the new car can be shortened from the present 25 or more hours to approximately 5 hours. When the supply of this furnished gasoline is exhausted, any conventional gasoline may then be used for further operation, dismantling of the engine being unnecessary.

It is understood that the described break-in procedure is not limited to breaking in new engines, but may also be applied to breaking in overhauled, renovated and rebuilt engines which may require breaking in.

Certain specific advantages, among others, which may be derived from operating according to the present invention include the following: when breaking in aircraft engines, most of which have relatively sensitive carburetor settings, it is not necessary to readjust the carburetor setting since a gasoline having the normal anti-detonation value commonly used for the break-in of the particular engine at hand may be employed, the addition of the required amount of iron carbonyl not affecting this value; it is not necessary to flush the crankcase of an engine after the break-in, since it has been determined that the residual amounts of iron carbonyl decomposition products remaining in the lubricating oil do not in any manner increase the rate of wear of moving parts in contact with the lubricating oil; the break-in, as accomplished according to the present invention, is definitely superior to that attained by conventional methods in that the piston ring faces and the entire cylinder surface over which they travel are smoother and more uniformly polished. In normal break-in procedure, polishing of piston ring faces and the lower part of the cylinder is attained to but a slight degree, if at all.

Another specific advantage which is derived by breaking in internal combustion engines according to the present invention is the material reduction of the phenomenon commonly called "feathering" of piston rings. The combination of a machined piston ring and a honed cylinder barrel in sliding contact presents conditions in which a slight protrusion on one surface may penetrate the separating film of oil and bring about metal-to-metal contact with the other surface. If the contact area is small and the pressure high, as in aircraft engines, the frictional heat developed may be sufficient to lower the yield point of the metal on both of the surfaces to the extent that actual metal displacement occurs. In some instances this results in elimination of the protrusions, but in other cases it may actually produce secondary protrusions which in turn will further distort the mating surface at another point. Such an intermittent condition of plasticity of the surface will permit it to creep in the line of the frictional forces, creating a "feathered" condition. When such "feathering" does occur, it has been found that excessive oil consumption inevitably follows, probably due to the tendency of the "feathered" surfaces of the piston rings to pump oil into the upper part of the cylinder, rather than scrape it towards the lower end of the cylinder. The accelerated break-in obtained by use of the fuels of the present invention, it has been found, greatly decreases the likelihood of piston ring "feathering" and the resultant high oil consumption and time-consuming engine overhauls.

This application is a divsion of application Serial No. 497,250, filed August 3, 1943.

I claim as my invention:

1. In a method for breaking in spark-ignition engines, the step comprising operating an engine for a period of at least approximately one hour and not more than approximately twenty hours with a gasoline containing iron carbonyl in amounts insufficient materially to raise the anti-detonation value of said gasoline.

2. In a method for breaking in spark-ignition engines, the step comprising operating an engine for a period of at least approximately one hour and not more than approximately twenty hours with a gasoline containing at least approximately .5 cc. of iron carbonyl and not exceeding the quantity of iron carbonyl required materially to raise the anti-detonation value of said gasoline.

3. In a method for breaking in spark-ignition engines, the step comprising operating an engine for a period of at least approximately one hour and not more than approximately ten hours with a gasoline containing at least approximately .5 cc. and not more than approximately 2 cc. of iron carbonyl per gallon.

4. In a method for breaking in spark-ignition engines, the steps comprising operating an engine for a period of at least approximately one hour and not more than approximately twenty hours with a gasoline containing at least approximately .5 cc. and not more than approximately 2 cc. of iron carbonyl per gallon, and then continuing the engine operation with a standard gasoline free from iron carbonyl.

5. In a method for breaking in spark-ignition aircraft engines, the step comprising operating an aircraft engine for a period of at least approximately one hour and not more than approximately ten hours with a gasoline having an octane number of at least approximately 70 and containing at least approximately .5 cc. per gallon of iron carbonyl and less than the amount of iron carbonyl required materially to raise the anti-detonation value of said gasoline.

6. In a method for breaking in spark-ignition aircraft engines, the steps comprising operating an engine for a period of at least approximately one hour and not more than approximately ten hours with a gasoline having an octane number of at least approximately 70 and containing from approximately .5 cc. to approximately 2 cc. per gallon of iron carbonyl, and then continuing the engine operation with a standard gasoline free from iron carbonyl.

WILLIAM MORRIS MALOTT.